United States Patent
Klein et al.

(10) Patent No.: US 10,844,190 B2
(45) Date of Patent: Nov. 24, 2020

(54) METHOD FOR PRODUCING RUBBER-MODIFIED BITUMEN USING VULCANIZED RUBBER

(71) Applicant: LANXESS Deutschland GmbH, Cologne (DE)

(72) Inventors: Thomas Klein, Heidelberg (DE); Torsten Ziser, Birkenau (DE)

(73) Assignee: LANXESS Deutschland GmbH, Cologne (DE)

( * ) Notice: Subject to any disclaimer, the term of this patent is extended or adjusted under 35 U.S.C. 154(b) by 212 days.

(21) Appl. No.: 15/752,375

(22) PCT Filed: Aug. 17, 2016

(86) PCT No.: PCT/EP2016/069498
§ 371 (c)(1),
(2) Date: Feb. 13, 2018

(87) PCT Pub. No.: WO2017/032661
PCT Pub. Date: Mar. 2, 2017

(65) Prior Publication Data
US 2018/0362724 A1   Dec. 20, 2018

(30) Foreign Application Priority Data

Aug. 21, 2015  (EP) .................................... 15181924

(51) Int. Cl.
*C08J 11/28* (2006.01)
*C08L 19/00* (2006.01)
*C08L 95/00* (2006.01)
*C08L 17/00* (2006.01)
*C08K 5/372* (2006.01)

(52) U.S. Cl.
CPC .............. *C08J 11/28* (2013.01); *C08K 5/372* (2013.01); *C08L 17/00* (2013.01); *C08L 19/003* (2013.01); *C08L 95/00* (2013.01); *C08L 2555/22* (2013.01); *C08L 2555/34* (2013.01); *C08L 2555/80* (2013.01)

(58) Field of Classification Search
CPC ........ C08L 19/003; C08L 95/00; C08L 17/00; C08L 2555/22; C08L 2555/34; C08L 2555/80; C08J 11/28; C08K 5/372
See application file for complete search history.

(56) References Cited

U.S. PATENT DOCUMENTS

| | | | |
|---|---|---|---|
| 4,104,205 | A | 8/1978 | Novotny et al. |
| 4,554,313 | A | 11/1985 | Hagenbach et al. |
| 4,567,222 | A | 1/1986 | Hagenbach et al. |
| 4,992,492 | A | 2/1991 | Sainton |
| 6,335,377 | B1 | 1/2002 | Izumoto et al. |

FOREIGN PATENT DOCUMENTS

| | | | |
|---|---|---|---|
| EP | 2395046 A1 | 12/2011 | |
| EP | 2164895 B1 | 2/2015 | |
| EP | 2955202 A1 | 12/2015 | |
| WO | WO-2011138412 A1 * | 11/2011 | ............ C08L 95/00 |

OTHER PUBLICATIONS

Machine translation of WO 2011 138412, Klein et al, Nov. 10, 2011.*
Hase, Manfred et al., Reports of the Federal Institute for Road Engineering, "Boundary Conditions for DSR Measurements on Bitumen", S47, 2006 Abstract, four pages.
The Shell Bitumen Handbook, "Polymer modified and special bitumens", Fifth Edition, 2003, Shell UK Oil Products Limited, ISBN: 0 7277 3220 X, Thomas Telford Publishing, five pages.
European Search Report from corresponding European Application No. 15181924, dated Dec. 22, 2015, two pages.
International Search Report from corresponding International Application No. PCT/EP2016/069498, dated Sep. 9, 2016, three pages.

* cited by examiner

*Primary Examiner* — Frances Tischler

(57) ABSTRACT

The present invention provides a novel process for producing rubber-modified bitumen using vulcanized rubber.

14 Claims, 1 Drawing Sheet

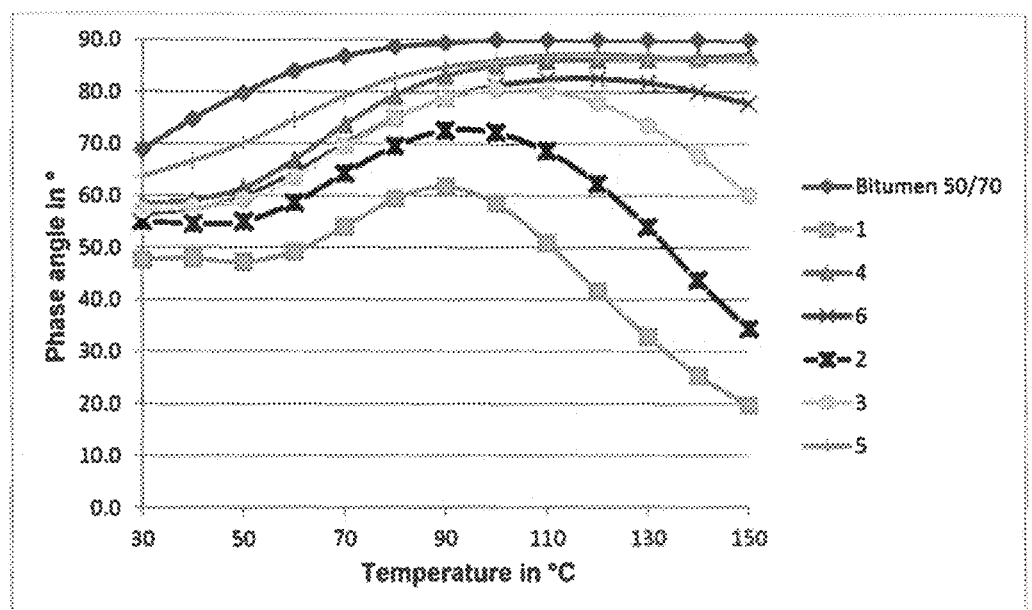

METHOD FOR PRODUCING RUBBER-MODIFIED BITUMEN USING VULCANIZED RUBBER

The present invention provides an improved process for producing rubber-modified bitumen using vulcanized rubber.

Rubber-modified bitumen, called upgraded bitumen, has the advantage over unmodified bitumen of viscoelastic properties that are substantially constant with temperature on variation of temperature: for instance, it is not as soft in great heat and it is not as brittle at low temperatures, and also has an increased lifetime.

Bitumen that has been modified in this way can be produced by mixing in an uncrosslinked polymer or a crosslinked rubber. Under some circumstances, the addition of uncrosslinked polymer entails subsequent crosslinking with sulfur or polysulfides; see U.S. Pat. No. 4,554,313. This route is very costly by virtue of the materials used alone.

Owing to the high costs for the polymers, rubber tires, which occur in a large volume, have been used in the past as a source for a substitute.

However, sulfur-vulcanized (crosslinked) rubber is relatively insoluble in bitumen, and so the reutilization thereof in special bitumen is problematic (Shell Bitumen Handbook, Shell UK, 2003 ISBN 0 7277 3220 X, page 79). Bitumen is stored and transported at high temperature, it being necessary to keep it homogeneous. Polymers that have been mixed in or have sparing solubility or dispersibility or else vulcanized rubber separate out in the mixture stored at high temperature. There is a difference in the performance properties of modified bitumen from different deposit zones, and so quality problems arise in roadbuilding. For instance, DE-A 3885974 describes problems with the stability of bitumen/ground rubber mixtures from a storage time of 6 hours onward at 200° C., which are manifested in a drop in the viscosity. A proposed solution to the problem is the addition of heavy oils having naphthenoaromatic character and a synthetic elastomer with unsaturated olefins having molecular weights exceeding 100 000 d. However, the amounts of the polymer of 2-3% that are additionally needed eliminate the economic advantage of replacing a polymer with recycled rubber. U.S. Pat. No. 3,338,849 describes the use of polyethylene in conjunction with gilsonite, a natural bitumen material, as a dispersant for recycled rubber. This solution is not found to be economically viable either.

In order to improve the solubility or dispersibility of crosslinked rubber, further methods have been developed using high temperature, high pressure in conjunction with steam and/or mechanical energy (for example in a twin-screw extruder; U.S. Pat. No. 6,335,377) or else by means of irradiation with microwaves (U.S. Pat. No. 4,104,205). However, these processes were neither sufficiently effective nor economically viable; they were unselective with regard to the sulfur bridge degradation. Thus, the polymer chain was also destroyed and hence the advantages associated with the use of polymers were reduced.

EP 2164895 describes a method of devulcanizing sulfur-crosslinked rubber vulcanizates for incorporation into rubber masses using alkyl polysulfides. It has the features that a) the polysulfide used is used especially in concentrations of 5%-20%, based on the vulcanized rubber used, and b) the vulcanization is conducted at a preferred temperature of 60° C., or 130° C., or, in the case of styrene-butadiene or natural rubber, at 80-150° C. There is no specification of further use of the rubber thus treated in bitumen mixtures.

This is because, in the case of rubber/bitumen mixtures, as mentioned, there is the problem of the substantial insolubility of rubber in bitumen. However, the specific aim of devulcanization, especially for use of used rubber in bitumen, should be to distinctly improve the solubility.

EP 2395046 specifies a process for producing rubber-modified bitumen in such a way that the used rubber (recycled used tires) is treated preferably with 5% to 20% by weight of alkyl polysulfide and then the used rubber thus treated is mixed into bitumen. An inventive example is specified, in which granular used rubber has been heated with 7% alkyl polysulfide at 150° C. for 4 hours. The mixture thus produced was found to be acceptable by the storage test according to DIN EN 13399 in other words, the mixture is storage-stable. However, a disadvantage is that large amounts of polysulfide are needed, which make the process more costly and can also have adverse effects on the consistency of the bitumen.

It was therefore an object of the present invention to provide an inexpensive process for producing rubber-modified bitumen using vulcanized rubber, which does not have the disadvantages of the prior art.

h has been found that, surprisingly, at temperatures of at least 140° C. during the heat treatment, less than 5% by weight of dial yl pclysulfide is actually sufficient to increase the solubility of rubber in hot bitumen such that the viscoelastic characteristics approach those of bitumen without added rubber. At the same time, surprisingly, even devulcanization times of preferably 20 min to 60 min are actually sufficient.

The present invention therefore provides an improved process for producing rubber-modified bitumen using vulcanized rubber, by which the sulfide bridges of the vulcanized rubber are broken (devuicanized) with a diallyl polysulfide of the general formula (1)

$$R^1\text{—}S_x\text{—}R^2 \tag{1}$$

where $R^1$ and $R^2$ are the same or different and are a linear or branched $C_1$-$C_{18}$-alkyl radical and x represents the numbers from 3 to 12, at temperatures of at least 140° C., where the proportion of the dialkyl polysulfide is up to 5% by weight, based on vulcanized rubber, and the devulcanized rubber is then mixed into the bitumen.

The diallyl polysulfides used in the process of the invention are compounds of the general formula (1)

$$R^1\text{—}S_x\text{—}R^2 \tag{1}$$

in which $R^1$ and $R^2$ are the same or different and are a linear or branched $C_1$-$C_{18}$-alkyl radical and x represents the numbers from 3 to 8.

In addition, it is further preferable when the diallyl polysulfides used are those in which $R^1$ and $R^2$ in the general formula are linear or branched $C_5$- to $C_{15}$-alkyl radicals.

It is likewise preferable when the dialkyl polysulfides used are those in which x in the general formula (1) is the numbers from 3 to 5 and $R^1$ to $R^3$ in the general formula are linear or branched $C_5$- to $C_{15}$-alkyl radicals.

Preferred dialkyl polysulfides are dialkyl tetrasulfide and/or dioctyl tetrasulfide, more preferably branched dialkyl tetrasulfides or dioctyl tetrasulfides.

The aforementioned dialkyl polysulfides are commercially available products, obtainable for example from Rhein Chemie Rheinau GmbH.

The dialkyl polysulfides can be used in the process of the invention either individually or in any blend with one another.

The dialkyl polysulfides are used preferably in amounts of 1% to 5% by weight, more preferably 1.5% to 4% by weight, especially of 1.5% to 3% by weight, based in each case on the rubber vulcanizate to be devulcanized.

Bitumen in the context of the invention refers to a mixture of different organic substances which is either naturally occurring or is obtained by distillation from mineral oil. Owing to its biological origin, bitumen consists mainly of carbon and hydrogen. It is a nonvolatile, dark-colored multisubstance mixture of organic substances, the viscoelastic characteristics of which change with temperature. Bitumen usable in the context of the invention is all kinds of commercially available bitumen, for example 50/70 or 70/100. This preferably includes roadbuilding bitumen according to DIN EN 12591.

The temperatures in the process of the invention are preferably 140-170° C., especially 150-160° C. The devulcanization time is preferably 20-60 min. more preferably 30-50 min, most preferably 35-45 min.

In the process of the invention, the breaking of the sulfide bridges and/or the mixing into the bitumen are preferably effected under mechanical stress.

Mechanical stress in the context of the invention means the use of mixing units, preferably extruders, internal mixers, high-pressure homogenizers such as, in particular, high-shear mixing units, for example Ultra-Turrax®, kneaders and/or roll mills. On the industrial scale, particular preference is given here to the use of extruders and/or internal mixers, but the type of extruder and/or internal mixer is not subject to any particular restriction. On the laboratory scale, particular preference is given to the high-shear mixing unit, for example an Ultra-Turrax®.

Examples mentioned hereinafter are twin-screw extruders or planetary roll extruders.

In the case of performance in an extruder, this is preferably effected under high shear, The vulcanized rubber is preferably metered in in the form of free-flowing particles at low temperature, i.e. at temperatures of 0 to 30° C., and then optionally heated. The particles of the rubber vulcanizates are preferably metered in at the start of the processing length of the extruder, followed by the metered addition of the dialkyl polysulfide.

In a further embodiment of the process of the invention, the dialkyl polysulfide is used together with oil, preferably mineral oil, more preferably naphthenic oil.

The amount of oil is between 0% and 30% by weight, more preferably 0% to 20% by weight, even more preferably 0% to 12% by weight and especially preferably 1%-8% by weight, based in each case on the rubber mixture to be devulcanized.

In the case of use of an internal mixer for mechanical stress, preference is given to internal mixers having intermeshing or tangential rotors. Particular preference is given here to an internal mixer with intermeshing rotors, since more shear energy can be introduced into the individual particles of the rubber vulcanizate in this way.

In the case of performance in an internal mixer too, in a further embodiment of the process of the invention, the dialkyl polysulfide, prior to addition, can be admixed with oil, for example mineral oil, e.g. naphthenic oil.

The procedure for the regeneration can be conducted either at standard pressure or under elevated pressure. A preferred regeneration pressure is between 1 and 20 bar, a particularly preferred regeneration pressure is between 1 and 10 bar, and a very particularly preferred regeneration pressure is between 1 and 3 bar.

In a further embodiment of the process of the invention, further additives such as metal compounds/salts, especially organic zinc compounds/salts, are metered in, for purposes including scavenging sulfides and hence reducing odor, as supplied by Rhein Chemie Rheinau GmbH under the Additin® RC 4530 and Additin® RC 4580 names.

The amount of additional additives is preferably 0.1% to 1% by weight.

The vulcanized rubber comprises crosslinked rubbers based on polydienes of the R group, including natural rubbers (NR), butadiene rubbers (BR), styrene-butadiene rubbers (SBR), acrylonitrile-butadiene rubbers (NBR) and butyl rubbers (IIR), vulcanizates of rubbers having few double bonds or double bond-free polymer backbones from the M group, including ethylene-propylene-diene rubber (EPDM), and mixtures of the aforementioned rubbers from the R and M group.

The rubber-modified bitumens produced by the process of the invention find use in building construction for sealing of parts of buildings with respect to water (bitumen roofing membranes for roof sealing), protection of steel against corrosion, and in roadbuilding as a binder for the aggregates in the asphalt (road surfacing).

The present invention additionally provides rubber-modified bitumen obtainable by mixing in vulcanized rubber wherein the sulfide bridges have been broken (devulcanized) by at least one dialkyl polysulfide of the general formula (1)

$$R^1—S_x—R^2 \qquad (1)$$

in which $R^1$ and $R^2$ are the same or different and are a linear or branched $C_1$-$C_{18}$-alkyl radical and x represents the numbers from 3 to 12, at temperatures of at least 140° C., where the proportion of the dialkyl polysulfide is up to 5% by weight, based on vulcanized rubber, and then mixing the latter into the bitumen.

The mixing into the bitumen is preferably effected under mechanical stress.

Mechanical stress in the context of the invention means the use of mixing units, preferably extruders, internal mixers, high-pressure homogenizers such as, in particular, high-shear mixing units, for example Ultra-Turrax®, kneaders and/or roll mills. On the industrial scale, particular preference is given here to the use of extruders and/or internal mixers, but the type of extruder and/or internal mixer is not subject to any particular restriction. On the laboratory scale, particular preference is given to the high-shear mixing unit, for example an Ultra-Turrax®.

In relation to the definitions, indices and preferred embodiments, reference is made to the above remarks.

The scope of the invention includes all general radical definitions, indices, parameters and illustrations mentioned above and below, and those mentioned in preferred ranges with one another, i.e. including any combinations between the respective ranges and preferred ranges.

The present invention is elucidated in detail by the examples which follow, but the invention is no way restricted to the examples.

EXPERIMENTAL EXAMPLES

The mixing vessels used were aluminum cans having a capacity of max, 900 mL. The rubber mixture was stirred using a modified anchor stirrer having two paddles. A lid was placed onto the can. Gases formed were conducted away via wash bottles. The temperature was measured by means of a probe thermometer which was guided through a further opening into the interior.

In the first step, the granular rubber was introduced into the aluminum vessel which was closed with the lid. The vessel was secured in the oil bath and the stirrer system was started. The dioctyl pentasulfide as dialkyl polysulfide was mixed with a carrier oil and metered in gradually through the small opening in the lid with the aid of a syringe.

After the metered addition, the rubber mixture was stirred at the temperature and for the time specified for the particular experiment number and with a stirrer speed of about 180 rpm.

After the heat treatment, bitumen was added until the rubber content made up 15% of the overall mixture. The rubber/bitumen mixture was stirred at 180° C. for 2 h in order to enable very good distribution of the rubber in the bitumen.

The following were used:

bitumen 50/70, from Shad, Nynas T 22, a naphthenic base oil, branched dioctyl pentasulfide as dialkyl polysulfide (polysulfide), and shredded car and truck tires as used rubber having a particle size of 0.2-0.8 mm.

In a series of experiments, the following experiments were conducted:

TABLE 1

Conditions of the pretreatment of vulcanized granular used rubber

| No. | Bitumen type and, if appropriate, mixture for rubber devulcanization | Temperature in the devulcanization [°] | Duration of devulcanization [min] |
|---|---|---|---|
| | Reference bitumen | | |
| 1 | bitumen 50/70 + 10% used rubber (not pretreated) | — | — |
| 2 | bitumen 50/70 + used rubber (15%), pretreated with 1.5% dialkyl polysulfide and 5.5% Nynas T 22 | 120 | 40 |
| 3 | bitumen 50/70 + used rubber (15%), pretreated with 1.5% dialkyl polysulfide and 5.5% Nynas T 22 | 140 | 40 |
| 4 | bitumen 50/70 + used rubber (15%), pretreated with 1.5% dialkyl polysulfide and 5.5% Nynas T 22 | 160 | 40 |
| 5 | bitumen 50/70 + used rubber (10%), pretreated with 7% dialkyl polysulfide and 10.5% Nynas T 22 | 150 | 240 |
| 6 | bitumen 50/70 + used rubber (10%), pretreated with 3.5% dialkyl polysulfide and 3.5% Nynas T 22 | 160 | 40 |

Rheological Measurements:

The viscoelastic properties of the rubber/bitumen mixtures comprising modified rubbers that have been obtained in experiments 1-6 were determined using a temperature sweep of the rheological indices of complex shear modulus $G^*$ and phase angle $\delta$ with a "dynamic shear rheometer according to DIN EN 14770. Details of the method can be found, for example, in "Rahmenbedingungen für DSR-Messungen an Bitumen" [Boundary Conditions for DSR Measurements on Bitumen], Berichte der Bundesanstalt für Straßenwesen [Reports from the German Federal Highway Research institute], Straßenbau [Roadbuilding] issue S 43 et seq. or in the presentation by Mr Wörner "Bitumen: Bewertung anhand konventioneller und rheologischer Kennwerte" [Bitumen: Assessment on the Basis of Conventional and Rheological Characteristics], XVI. Weimarer Straßenbau- und Baustoffsymposium [XVIth Weimar Roadbuilding and Construction Material Symposium], Mar. 27, 2014, Weimar.

This involved installing the binder sample between two parallel metal plates and subjecting it to varying, in this case oscillating, shear stress.

The diameter of the two parallel plates was 25 mm. A gap of 2 mm was used. The frequency of the sinusoidal stress was 1.59 Hz (angular frequency $\omega=10$ s$^{-1}$) and the maximum deformation was 10% of the plate separation. The equilibration time between the test intervals was 15 min.

TABLE 2

Rheological indices as a function of temperature for bitumen 50/70 or rubber-modified bitumens (RMBs) with used rubber in untreated form or pretreated in accordance with table 1

| Temp. °C. | Reference bitumen 50/70 | | 1 (C) | | 2 (C) | | 3 (I) | |
|---|---|---|---|---|---|---|---|---|
| | Shear mod. Pa | Phase angle ° | Shear mod. Pa | Phase angle ° | Shear mod. Pa | Phase angle ° | Shear mod. Pa | Phase angle ° |
| 30 | 362 400 | 68.9 | 951 950 | 47.7 | 407 845 | 55.1 | 355 395 | 57.2 |
| 40 | 70 385 | 74.8 | 290 965 | 47.9 | 114 385 | 54.7 | 95 500 | 57.8 |
| 50 | 14 337 | 79.8 | 100 113 | 47.2 | 36 826 | 55.1 | 28 907 | 59.2 |
| 60 | 3329 | 84.0 | 39 783 | 49.2 | 13 511 | 58.7 | 9902 | 63.5 |
| 70 | 890 | 86.8 | 16 614 | 54.0 | 5215 | 64.3 | 3591 | 69.5 |
| 80 | 281 | 88.6 | 7069 | 59.4 | 2107 | 69.6 | 1378 | 74.9 |
| 90 | 102 | 89.4 | 3159 | 61.7 | 912 | 72.6 | 566 | 78.8 |
| 100 | 43 | 90.0 | 1612 | 58.5 | 438 | 72.2 | 254 | 80.5 |
| 110 | 20 | 90.0 | 993 | 50.9 | 239 | 68.7 | 127 | 80.2 |
| 120 | 10 | 90.0 | 744 | 41.5 | 154 | 62.4 | 72 | 77.9 |
| 130 | 6 | 90.0 | 635 | 32.8 | 119 | 54 | 46 | 73.6 |
| 140 | 3 | 90.0 | 601 | 25.4 | 111 | 43.7 | 33 | 67.7 |
| 150 | 2 | 90.0 | 602 | 19.7 | 114 | 34.4 | 28 | 60.2 |

| Temp. °C. | 4 (I) | | 5 (C) | | 6 (I) | |
|---|---|---|---|---|---|---|
| | Shear modulus Pa | Phase angle ° | Shear modulus Pa | Phase angle ° | Shear modulus Pa | Phase angle ° |
| 30 | 281 310 | 58.5 | 490 000 | 63.7 | 482 000 | 56.6 |
| 40 | 75 024 | 59.2 | 104 000 | 66.7 | 125 000 | 57.5 |
| 50 | 22 383 | 61.5 | 25 700 | 70.1 | 37 900 | 59.8 |
| 60 | 7400 | 66.9 | 7220 | 74.6 | 12 900 | 64.4 |
| 70 | 2547 | 73.7 | 2250 | 79.1 | 4640 | 69.9 |
| 80 | 928 | 79.3 | 799 | 82.6 | 1800 | 75 |
| 90 | 366 | 83.1 | 320 | 84.7 | 765 | 78.8 |
| 100 | 73 | 86.1 | 65 | 87 | 172 | 82.4 |
| 110 | 73 | 86.1 | 65 | 87 | 172 | 82.4 |
| 120 | 38 | 86.3 | 33.1 | 87.2 | 89.5 | 82.6 |
| 130 | 21 | 86.4 | 18.2 | 86.8 | 50 | 81.8 |
| 140 | 13 | 86.6 | 10.9 | 86.1 | 29.9 | 80.1 |
| 150 | 9 | 87.2 | 6.9 | 86.2 | 19.1 | 77.8 |

(I) = inventive,
(C) = comparative

As shown by table 2 and FIG. 1, there is a change in the rubber-modified bitumen of the invention (see examples 3, 4 and 6), especially in the range of 140-150° C. approaching the processing temperature (170-180° C.), with regard to the phase angle toward the behavior known from unmodified bitumen. This corresponds to more homogeneous bitumen and hence better dissolution characteristics.

What is found here, in an impressive manner, is that even 1.5% by weight (experiment 3 and especially experiment 4) or 3.5% by weight (experiment 6) of dialkyl polysulfide is sufficient, provided that the temperature during the devulcanizing is at least 140° C. This becomes clear particularly by comparison with comparative experiment 5, where 7% dialkyl polysulfide was used.

The comparison of experiment 2 (1.5% dialkyl polysulfide with a pretreatment temperature of 120° C.) and experiment 4 (1.5% dialkyl polysulfide with a pretreatment temperature of 160° C.) very clearly shows the importance of the temperature during the devulcanizing. In the case of experiment 4 (inventive), the characteristics of unmodified bitumen are nearly achieved within the higher temperature range; the case of experiment 2 comes very close to the case of RMB with 15% untreated granular rubber (experiment 1).

In addition, it was possible by the process of the invention not just to lower the amount of dialkyl polysulfide if the temperature is at least 140° C.; it was also possible to lower the duration for the devulcanization to below one hour.

What is claimed is:

1. A process for producing rubber-modified bitumen using vulcanized rubber, the process comprising:
   devulcanizing the vulcanized rubber by breaking the sulfide bridges thereof by contacting the vulcanized rubber with at least one dialkyl polysulfide of the general formula (1)

$$R^1 \text{---} S_x \text{---} R^2 \qquad (1)$$

where $R^1$ and $R^2$ are the same or different and are a linear or branched $C_1$-$C_{18}$-alkyl radical and x represents the numbers from 3 to 12, at temperatures in a range of from 140° C. to 170° C. for a time of from 20 to 60 minutes, where the proportion of the dialkyl polysulfide is from 1.5% to 4% by weight, based on vulcanized rubber, and mixing the devulcanized rubber into the bitumen.

2. The process as claimed in claim 1, wherein the contacting further comprises contacting the vulcanized rubber with the dialkyl polysulfide with an oil.

3. The process as claimed in claim 1, wherein the contacting of the vulcanized rubber to break the sulfide bridges and/or the mixing into the bitumen are effected under mechanical stress.

4. The process as claimed in claim 1, wherein the dialkyl polysulfide is branched dioctyl pentasulfide or branched dioctyl tetrasulfide.

5. The process as claimed in claim 1, wherein x represents the numbers from 3 to 8.

6. The process as claimed in claim 1, wherein $R^1$ and $R^2$ are linear or branched $C_5$- to $C_{15}$-alkyl radicals.

7. The process as claimed in claim 1, wherein x represents the numbers from 3 to 8, and $R^1$ and $R^2$ are linear or branched $C_5$- to $C_{15}$-alkyl radicals.

8. The process as claimed in claim 1, wherein the dialkyl polysulfides are dialkyl tetrasulfides.

9. The process as claimed in claim 1, wherein the contacting further comprises contacting the vulcanized rubber with the dialkyl polysulfide and up to 30 wt % mineral oil based on the rubber mixture to be devulcanized.

10. The process as claimed in claim 8, wherein the proportion of the dialkyl polysulfide is 1.5% to 3% by weight, based on the vulcanized rubber, the temperatures in the process is 150-160° C., the contacting is for a period of time 35-45 min; and the contacting further comprises contacting the vulcanized rubber with the dialkyl polysulfide and 1 to 6 wt % mineral oil based on the rubber mixture to be devulcanized.

11. The process as claimed in claim 1, wherein the devulcanization time is 30-50 min.

12. The process as claimed in claim 1, wherein the devulcanization time is 35-45 min.

13. The process as claimed in claim 2, wherein the oil is mineral oil.

14. The process as claimed in claim 1, wherein the dialkyl polysulfides are dioctyl tetrasulfides.

* * * * *